United States Patent Office 3,391,088
Patented July 2, 1968

3,391,088
CATALYST PREPARED BY STEAMING HIGH SILICA ALKALI METAL ALUMINOSILICATES IN A MATRIX
Charles J. Plank, Woodbury, and Edward Rosinski, Deptford, N.J., assignors to Mobil Oil Corporation, a corporation of New York
No Drawing. Continuation-in-part of application Ser. No. 492,309, Oct. 1, 1965, which is a continuation-in-part of applications Ser. No. 379,813, July 2, 1964, Ser. No. 449,603, Apr. 20, 1965, and Ser. No. 466,096, June 22, 1965. This application Mar. 7, 1967, Ser. No. 621,144
10 Claims. (Cl. 252—455)

ABSTRACT OF THE DISCLOSURE

This invention is directed towards a process for the preparation of highly active catalysts having excellent steam stability. It involves compositing an alkali metal aluminosilicate having a silicon to aluminum ratio of at least 1.5 with specific inorganic oxide matrices and then subjecting the composite to the action of steam. It has been found that by this treatment the alkali metal of the aluminosilicate in some way migrates to the inorganic oxide matrix and is trapped therein thereby forming a highly stable and active catalyst composition.

CROSS-REFERENCES TO RELATED APPLICATIONS

This application is a continuation-in-part of application Ser. No. 492,309, filed Oct. 1, 1965, now abandoned; the same being a continuation-in-part of application Ser. No. 379,813, filed July 2, 1964 (now Patent No. 3,257,310), application Ser. No. 449,603, filed Apr. 20, 1965 (now Patent No. 3,210,267), and application Ser. No. 466,096, filed June 22, 1965 (now Patent No. 3,271,418). Application Ser. No. 621,138, filed concurrently herewith, claims catalysts herein disclosed and prepared by steaming of alkali metal zeolites mixed with matrix material and a polyvalent metal compound.

BACKGROUND OF THE INVENTION

Field of the invention

This invention relates to a new and improved cracking catalyst characterized by unusual ability to selectively crack high molecular weight hydrocarbon oils to lighter material boiling in the gasoline range. In one embodiment, the invention is concerned with a catalyst composition comprising the reaction product of a crystalline alkali metal aluminosilicate with an inorganic oxide matrix wherein interaction of the aluminosilicate and matrix components is controlled to produce a highly active and selective catalyst. In another embodiment, the invention is directed to a method for producing such catalyst.

DESCRIPTION OF THE PRIOR ART

Catalyst of enhanced activity and having a markedly superior selectivity for production of gasoline by cracking of high boiling hydrocarbons has been widely adopted following the discoveries described in U.S. Patents such as 3,140,249 (Plank et al., July 7, 1964) and 3,257,310 (Plank et al., June 21, 1966). As shown in the earlier of these patents, crystalline aluminosilicates in such porous matrices as silica-alumina gels and equivalent refractory porous solids known to the catalytic cracking art are unusually effective cracking catalysts when so treated as to have low content of alkali metal. Effective treatments there shown include base exchange with aqueous solutions which contain cations capable of replacing the original alkali metal content of the aluminosilicates. The later patent reveals benefits obtained by steam treatment of such composites.

SUMMARY OF THE INVENTION

This invention provides a technique for the preparation of highly active catalysts of excellent stability to steam, hence high stability under reaction conditions in which the catalyst is exposed to high temperature steam atmospheres, as in many types of commercial catalytic cracking plants. The new method operates on aluminosilicates which are inherently unstable to steam due to concentration of alkali metal cations. Such high alkali metal aluminosilicates of silicon to aluminum ratio equal to at least about 1.5 are combined with inorganic oxide matrix material, preferably of high alumina content, to form a reaction mixture, which is subjected to the action of steam. In these reaction mixtures, the agent which is normally destructive of these alkali metal aluminosilicates converts the same to a highly active, steam-stable catalyst.

DESCRIPTION OF SPECIFIC EMBODIMENTS

In accordance with the present invention, it has been discovered that highly active and stable cracking catalysts can be prepared from crystalline alkali metal aluminosilicates by thermally interacting the aluminosilicate with an inorganic oxide matrix so as to achieve fixation of alkali metal cations within the matrix component. It has been discovered that stability can be obtained without necessitating pre-exchange of an alkali metal aluminosilicate by providing a sink for irreversible removal of alkali metal into a second component of the catalyst composite itself. Thus, when an alkali metal crystalline aluminosilicate is mixed with an inorganic oxide matrix and thermally interacted in the presence of steam as hereinafter defined, the alkali metal migrates irreversibly into the inorganic oxide matrix and becomes insoluble. While the total alkali metal content of the composite remains the same and may be high, i.e., greater than 1 weight percent, the amount of exchangeable alkali metal in the composite is below about 0.6 weight percent and excellent stability is achieved. In contradistinction to previous methods for preparing highly active crystalline aluminosilicate catalysts wherein the alkali content of the aluminosilicate has been minimized and reduced by substantial replacement to obtain steam-stable compositions, the present invention provides a means whereby the as-synthesized or unstable alkali metal form of the crystalline aluminosilicate can be used directly to obtain stable catalyst compositions of unusually high catalytic activity and selectivity. The enhanced activity of the catalyst is dependent upon controlled interaction of the crystalline alkali metal aluminosilicate zeolite with the inorganic oxide matrix so as to achieve fixation and irreversible migration of alkali metal cations within the matrix component. The unusual use of the matrix material in accordance with the invention serves to provide a dual effect of rendering alkali metal cations inactive and contributing unique properties to the resulting combination which are not possessed by either component alone.

The present invention is concerned in one aspect with a method for the preparation of a catalyst composition comprising an alkali metal crystalline aluminosilicate zeolite and an inorganic oxide matrix wherein the catalyst is prepared by forming a mixture of both components, thermally reacting the mixture at temperatures of at least 800° F. in the presence of steam for a period of at least one-half hour, and thereafter recovering the resulting product being characterized by having less than 0.6 weight percent, based on the total composite, of exchangeable alkali metal when treated with excess 25 percent aqueous ammonium chloride solution at 180° F. for 24 hours.

The aluminosilicates used for purposes of the invention are base-exchangeable alkali metal or alkali metal-containing crystalline aluminosilicates which are unstable to steam. As defined herein, "unstable to steam" means that such aluminosilicate will lose greater than 50 percent and usually more than 70 percent of its rigid three-dimensional structure as defined by X-ray crystallinity, sorption capacity and/or surface area, when treated with 100 percent steam at 1200° F. for 24 hours under a pressure of 15 p.s.i.g. Aluminosilicates meeting this definition include the as-synthesized or alkali metal forms as well as alkali metal-containing aluminosilicates which have been partially pre-exchanged with one or more cations to reduce the original alkali metal content. As an example, alkali metal aluminosilicates having the crystallographic structure of faujasite, such as zeolites X and Y, contain approximately 14 weight percent and 10 weight percent sodium, respectively, and will lose at least 99 percent of their surface area when treated with steam under the conditions above defined. Similarly, when the alkali metal form of zeolite Y is base-exchanged with rare earth cations and partially reduced to a sodium level of 4.3 weight percent, 75 percent of its surface area is lost upon steaming. At a sodium level of 6 weight percent, a 97 percent loss of surface area is obtained. Similarly, when the sodium level of zeolite X is reduced to 5.9 weight percent with rare earth cations, a 98 percent loss of surface area is obtained upon steaming. As a general guide, it may be stated that base-exchangeable crystalline aluminosilicates which contain at least 4 weight percent alkali metal are unstable to steam within the definition above described. As a result of being unstable to steam, such aluminosilicates are extremely poor catalysts for the conversion of hydrocarbons.

The crystalline aluminosilicates utilized in accordance with the invention may be expressed in terms of oxide mole ratios which correspond to the general formula:

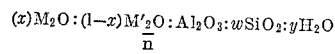

$$(x)M_2O:(1-x)M'_{\frac{2}{n}}O:Al_2O_3:wSiO_2:yH_2O$$

wherein M represents an alkali metal cation; M' represents a polyvalent metal having a valence of $n$; $x$ is a number such that the alkali metal content is at least 4 weight percent; $w$ is a number between 3 and 20 representing the moles of $SiO_2$, and $y$ the moles of $H_2O$. Many of these aluminosilicates are found in nature, for example, chabazite and erionite; while others, such as zeolites A, X, L and Y, may be synthesized by reacting silica and alumina with caustic at temperatures of about 100° C. for periods of 15 minutes to 90 hours or more. The aluminosilicates are essentially the dehydrated forms of crystalline hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern and may be base-exchanged with numerous cations. The structure contains a large number of small cavities, interconnected by a number of still smaller holes or channels. The alkali metal-containing aluminosilicates used in preparation of the present catalyst have a uniform pore structure comprising openings characterized by pores having openings of uniform size greater than 4 and less than 15 Angstrom units, the pore openings being sufficiently large in three dimensions to admit the molecules of the hydrocarbon charge desired to be converted. The preferred crystalline aluminosilicates will have a rigid three-dimensional network characterized by a system of cavities and interconnecting ports or pore openings, the cavities being connected with each other in three dimensions by pore openings or ports which have minimum diameters of at least 6 Angstrom units.

Aluminosilicates falling within the scope of the above formula are well known and include synthetic materials designated as zeolites Y, L and T and natural alumino-silicates such as gmelinite, erionite, faujasite and chabazite. The useful aluminosilicates have a sorption capacity of 760 millimeters and 25° C. of at least 4 weight percent of normal butane. Particularly preferred materials are the crystalline alkali metal aluminosilicates which have a silica to alumina mole ratio of at least 3 and a pore size of between 6 and 15 Angstrom units.

Pursuant to the teachings of the invention, the alkali metal aluminosilicate is combined, dispersed or otherwise intimately admixed with an organic oxide matrix which, under the thermal conditions hereinbelow described, is capable of interacting with the aluminosilicate so as to achieve fixation and irreversible migration of alkali metal cations within the matrix component. The inorganic oxide matrix which can be employed for this purpose is capable of wide selection and may be amorphous, crystalline or a material which is both crystalline and amorphous.

Typical matrix components are the alumina-containing siliceous inorganic oxides which occur naturally, such as the various clay minerals. Representative clays include attapulgite, kaolin, sepiolite, polygarskite, kaolinite, bentonite, montmorillonite, illite, chlorite and halloysite. Of the foregoing, the preferred materials are the two-layered clays such as the members of the kaolinite group, i.e., kaolinite, dickite, nacrite, and halloysite. The clay materials may be utilized directly in their natural or raw state, or may be previously water-washed, acid-treated, caustic-treated, calcined or otherwise treated prior to mixing with the aluminosilicate.

Other preferred matrix materials are the alumina-containing inorganic oxides which are prepared by synthetic formulation of composites of alumina with a hydrous inorganic oxide of at least one metal selected from the group consisting of metals of Groups II–A, III–B and IV–A of the Periodic Table. Such components include, for example, silica-alumina, alumina-zirconia, alumina-titania, alumina-beryllia, as well as ternary combinations such as silica-alumina-thoria, silica-alumina-zirconia, and silica-alumina-magnesia. Particular preference is accorded synthetic composites of silica-alumina, alumina-zirconia and silica-alumina-zirconia. In the foregoing composites alumina is generally present as the minor component and the other oxides of metals are present in major proportion. Thus, the alumina content of such composites is generally within the approximate range of at least 10 weight percent, preferably 15 to 55 weight percent, with the other hydrous inorganic oxide content ranging from 45 to 90 weight percent. When the inorganic oxide matrix is an amorphous material such as a composite of alumina with a hydrous inorganic oxide of a metal, such as above described, a high alumina content, e.g., 15 to 55 weight percent, preferably 25 to 55 weight percent, is desired in order to facilitate fixation of the alkali metal cations within the matrix component. Additionally, such composites are preferably prepared in the form of a finely divided homogeneous precipitate or co-gel by techniques which are well known in the art.

The alkali metal aluminosilicate is dispersed, combined or otherwise admixed intimately with the matrix component in any desired manner such as in a ball mill, pulverizer, jet mill, muller mixer or the like. The mixing operation can be effected with dry materials, or in the presence of an aqueous or non-aqueous medium, e.g., water or an inert solvent such as benzene. The alkali metal aluminosilicate usually has a particle size of less than 40 microns, preferably less than 10 microns, and is mixed with the inorganic oxide matrix in the form of a slurry. The mixture can be then extruded, pelleted or otherwise agglomerated to obtain uniform or irregularly shaped particles which may vary in size from 20 microns to ¼ inch in diameter. Following the formation of pellets the composite is dried, if necessary, to remove substantially all the liquid therefrom. While drying may be effected at ambient temperatures, it is more satisfactory to facilitate the removal of liquid by maintaining the composition at a temperature between about 150° F. and 1000° F. for 4 to 48 hours.

As hereinafter shown, it is a critical feature of the invention that the inorganic oxide matrix component be present in the final composite in an amount sufficient to achieve fixation and irreversible migration of alkali metal cations within the matrix component when the aluminosilicate and matrix component are subsequently thermally interacted. When the as-synthesized or alkali metal form of the aluminosilicate is employed, the matrix component must be used in an amount corresponding to at least 50 percent by weight, and preferably 70 percent by weight or more, based on the final composite. When aluminosilicates are used which have been partially pre-exchanged with one or more polyvalent cations to reduce the original alkali metal content, the matrix component may be used in an amount as small as 40 percent by weight, based on the final composite. In this embodiment, less matrix is required since the partially exchanged aluminosilicate even though unstable to steam, i.e., containing at least 4 percent by weight alkali, contains a lesser amount of alkali metal cations for fixation within the matrix component. The amount of aluminosilicate employed will be less than 60 weight percent and preferably less than 25 weight percent, based on the final composite.

After formation of the composite, the alkali metal aluminosilicate and matrix component are thermally interacted with one another at elevated temperatures of at least 800° F., preferably 1100° F. or higher, in the presence of steam for a period of at least one-half hour. As will appear from data set forth hereinafter, the exposure of the catalyst composite to thermal conditions in the presence of steam serves to render alkali metal cations harmless by effecting fixation and irreversible migration of the alkali metal cations within the framework of the matrix component. The thermal interaction may be accomplished at temperatures ranging from 800° F. up to the decomposition temperature of the particular aluminosilicate employed, which is generally less than about 1600° F., in an atmosphere consisting of a substantial amount of steam ranging from 5 to 100 percent by volume. The steam treatment may be effected at subatmospheric, atmospheric or superatmospheric pressures. Thermal interaction is controlled to achieve fixation of the alkali metal cations so that the final composite contains less than 0.6 weight percent, preferably less than 0.4 weight percent, based on the final composite, of exchangeable alkali metal. At a temperature of 1200° F. under a steam pressure of 1 atmosphere for a period of 1 hour the composite will contain less than 0.6 weight percent exchangeable alkali metal as determined by base exchange with an excess of 25 percent aqueous ammonium chloride solution at 180° F. for 24 hours. By increasing the period of time, however, e.g., from 2 to 25 hours or more, the composite will contain less than about 0.4 weight percent and may contain less than 0.2 weight percent exchangeable alkali metal. The preferred temperature range thus ranges from at least 1100° F. for a period of at least one-half hour in the presence of steam under atmospheric pressure.

In general, control of the fixation operation can be readily achieved by conducting steaming of the reaction mixture as a step in the catalyst manufacturing process before applying the product to use as a catalyst. In the alternative, this final step can be conducted in the equipment in which the catalyst is to be employed. For example, it is common practice to operate many types of catalytic cracking units under conditions which provide steam atmospheres of adequate concentration at various points. The charge stock may be admitted to the reactor admixed with steam. Steam may be employed as purging or sealing medium, or both, between reactor and regenerator. Indeed, the regenerator may, itself, provide adequate concentration of steam as a sum of moisture in the air plus that generated by line burner, if any, and that resulting from hydrogen content, if any, of the "coke" burned from the catalyst in regeneration. The requisite time of steaming need not be one uninterrupted period, but may be the accumulation of successive shorter intervals. The essential feature is that the agent normally destructive of the catalytic agent may, in a proper reaction mixture, be the essential stabilizing agent. Thus, an effective mode of applying the invention is to supply the raw reaction mixture as make-up to an operating catalytic cracker.

The method heretofore described is applicable, with or without modification, to treatment of aluminosilicates of high silica content, a ratio of silicon to aluminum of at least about 1.5.

In a modification usable regardless of silicon to aluminum ratio of the aluminosilicate, various metal compound promoters can be incorporated within the aluminosilicate-matrix reaction mixture for the purpose of enhancing catalytic behavior of the final catalyst product. Preferred promoters are salts and oxides of polyvalent metals such as aluminum, manganese, magnesium, calcium, rare earth, iorn, chromium and the like. The preferred compounds are the salts of the rare earths, particularly the rare earth chlorides. The amount of promoter may range from 0 to 25 weight percent based on the final catalyst composite and is preferably within the range of 0.5 to 15 weight percent.

Cracking, utilizing the catalyst described herein, may be carried out at catalytic cracking conditions employing a temperature within the approximate range of 700° F. to 1200° F. and under a pressure ranging from subatmospheric pressure up to several hundred atmospheres. The contact time of the oil with the catalyst is adjusted in any case according to the conditions, the particular oil feed and the particular results desired to give a substantial amount of cracking to lower boiling products. Cracking may be effected in the presence of the instant catalyst utilizing well-known techniques including, for example, those wherein the catalyst is employed as a fluidized mass, fixed bed, or as a compact particle-form moving bed.

The catalysts of the present invention are especially suitable for use in both the "moving-bed" and "fluid" cracking processes. In the "moving-bed process' (e.g., Thermo for Catalytic Cracking or TCC), catalyst particles are used which are generally in the range of about 0.08 to 0.25 inch in diameter. Useful reaction conditions include temperature above about 850° F., pressures from subatmospheric to approximately 3 atmospheres, catalyst to oil ratios of about 1.5–15 and liquid hourly space velocities of about 0.5 to 6. In the "fluidized catalytic cracking" process (or FCC) catalyst particles are used which are generally in the range of 10 to 150 microns in diameter. The commercial FCC processes include one or both of two types of cracking zones—a dilute bed (or "riser") and a fluid (or dense) bed. Useful reaction conditions in fluid catalytic cracking include temperatures above 850° F., pressures from subatmospheric to 3 atmospheres, catalyst-to-oil ratios of 1 to 30, oil contact time less than about 12 to 15 seconds in the "riser," preferably less than about 6 seconds, wherein up to 100 percent of the desired conversion may take place in the "riser," and a catalyst residence (or contact) time of less than 15 minutes, preferably less than 10 minutes, in the fluidized (or dense) bed.

The catalysts described herein may also be used to catalyze a wide variety of different organic conversion processes other than cracking. A typical example is the use of such catalysts for hydrocracking hydrocarbon fractions such as gas oils, residual oils, cycle stocks, whole topped crudes and heavy hydrocarbon fractions derived by the destructive hydrogenation of coal, tars, pitches, asphalts, and the like. The hydrogenation component can include metals, oxides and sulfides of metals of the Periodic Table which fall in Group V including vanadium, Group VI including chromium, molybdenum, tungsten and the like, and Group VIII including cobalt, nickel, platinum, palladium, rhodium and the like, and combinations of metals, sulfides and oxides of metals of the foregoing such as nickel-tungsten sulfide, cobalt-molybdenum oxide, cobalt-molybdenum sulfide and the like. The amount of hydrogenation component can range from about 0.1 to about 30 weight percent based on the catalyst. The hydrogenation component may be combined with the catalyst composite in any feasible manner, such as impregnation, coprecipitation, cogellation, mechanical admixture and the like. The hydrocracking operation is generally carried out at a temperature between about 400° F. and about 950° F. The hydrogen pressure in such operation is generally within the range of about 100 and about 3000 p.s.i.g. and, preferably, about 350 to about 2000 p.s.i.g. The liquid hourly space velocity, i.e., the liquid volume of hydrocarbon per hour per volume of catalyst is between about 0.1 and about 10. In general, the molar ratio of hydrogen to hydrocarbon charge employed is between about 2 and about 80, and preferably between about 5 and about 50.

The following examples illustrate the best mode now contemplated for carrying out the invention. In each of the following catalyst preparations, the compositions were dried at 1000° F. for 10 hours prior to thermal interaction. In each example where exchangeable sodium is shown, this was determined on a small test sample. A 5-gram sample of the catalyst was contacted for 24 hours at 180° F. with 20 grams of a 25% solution of $NH_4Cl$. After washing free of chloride ions, the sample was dried and calcined and the sodium content determined. Calculations were made by subtracting the sodium content of the exchanged sample from that of the original sample. Catalytic data were obtained on the remainder of the example.

The following examples illustrate the use of various inorganic oxide matrices which can be used in accordance with the invention.

Example 1

In the preparation of this example, 48.4 grams of sodium faujasite (Si/Al>1.5; 78.4% solids) were mixed with 182 grams of halloysite clay (83.2 weight percent solids) and 450 cc. water for 2 minutes in a blender. The slurry, after being dried to remove the liquid phase, was thermally treated at 1200° F. with 100% steam for 24 hours under a pressure of 15 p.s.i.g. The composite analyzed 1.7 weight percent sodium. After treating a test sample of the composite with an excess of 25% aqueous ammonium chloride solution at 180° F. for 24 hours, the sample analyzed 1.66 weight percent sodium.

Example 2

In the preparation of this example, a $ZrO_2/Al_2O_3$ matrix was first prepared by mixing 228 grams $$Zr(SO_4)_2 \cdot 4H_2O$$

and 655 grams $Al_2(SO_4)_3 \cdot 18H_2O$ and 1800 cc. $H_2O$ and then precipitating the solution with $NH_4OH$ to 6.2 pH using 529 cc. $NH_4OH$ (29.9 weight percent $NH_3$). This precipitate was washed free of sulfate ion, then air dried at room temperature. To 437.8 grams of this hydrous material (63.3 grams solids) was added 54.7 grams of sodium faujasite (Si/Al>1.5; 50.5% solids) and 590 cc. water in a blender. The resulting slurry, after being dried to remove the liquid phase, was thermally treated at 1225° F. with 100% steam for 20 hours at atmospheric pressure. The composite analyzed approximately 1.0 weight percent sodium. After treating a test sample of the composite with an excess of 25% aqueous ammonium chloride solution at 180° F. for 24 hours, the sample analyzed 0.48 weight percent sodium.

The cracking activity of the catalyst composites prepared in Examples 1 and 2 is illustrated in Table 1 below by their ability to catalyze the conversion of a Mid-Continent gas oil having a boiling range of 450° F.–950° F. to gasoline having an end point of 410° F. Vapors of the gas oil are passed through the catalyst at a temperature of about 900° F., substantially at atmospheric pressure, at a feed rate of 2.0 to 4.0 volumes of liquid oil per volume of catalyst per hour for ten minutes. The method of measuring the catalyst was to compare the various product yields obtained with such catalyst with yields of the same products given by conventional silica-alumina catalyst at the same conversion level. The differences (delta values) shown hereinafter represent the yields given by the present catalyst minus yields given by a conventional silica-alumina catalyst.

The catalytic results summarized in Table 1 clearly demonstrate that the composition prepared in accordance with the invention are highly active and selective in producing more $C_5+$ gasoline than the standard silica-alumina reference catalyst.

TABLE 1

| Example | 1 | 2 |
|---|---|---|
| Composition: | | |
| Na, wt. percent | 1.70 | 1.0 |
| Na, wt. percent after exchange | 1.66 | 0.48 |
| Na, wt. percent exchangeable | 0.04 | 0.52 |
| Catalytic Evaluation: | | |
| Conditions: | | |
| LHSV | 4 | 2 |
| C/O | 1.5 | 3 |
| Conversion, vol. percent | 73.1 | 71.7 |
| $C_5+$ Gasoline, vol. percent | 61.4 | 54.2 |
| Total $C_4$'s, vol. percent | 15.4 | 16.5 |
| Dry Gas, wt. percent | 6.7 | 7.3 |
| Coke, wt. percent | 2.0 | 4.7 |
| $H_2$, wt. percent | 0.03 | 0.12 |
| Delta Advantage over Si/Al: $C_5+$ Gasoline, vol. percent | +12.8 | +6.1 |

Examples 3, 4 and 5 below illustrate the use of various types of crystalline aluminosilicates which can be employed in accordance with the invention.

Example 3

In the preparation of this example, 29.5 grams (84.9% solids) of a crystalline aluminosilicate identified as zeolite

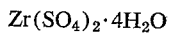
$$L (1.0 \pm 0.1 M_{\frac{2}{n}} O : Al_2O_3 : 6.4 \pm 0.5 SiO_2)$$

were added with 258 grams of McNamee kaolin clay (87.4 weight percent solids) to 600 cc. water and mixed for 2 minutes in a blender. The resulting slurry, after being dried to remove the liquid phase, was thermally treated at 1200° F. with 100% steam for 24 hours under a pressure of 15 p.s.i.g. The composite analyzed 1.7 weight percent sodium. After treating a test sample of the composite with an excess of 25% aqueous ammonium chloride solution at 180° F. for 24 hours, the sample analyzed 1.22 weight percent sodium.

Example 4

In the preparation of this example, 25.9 grams of a crystalline aluminosilicate identified as zeolite X (Si/Al<1.5; 96.8% solids) were blended with 277 grams raw halloysite clay (81.3% solids) and 600 cc. water in a blender for 2 minutes. The resulting slurry, after being dried to remove the liquid phase, was thermally treated at 1225° F. with 100% steam for 20 hours at atmospheric pressure. The composite analyzed approximately 1.44 weight percent sodium. After treating a test sample of the composite with an excess of 25% aqueous ammonium chloride solution of 180° F. for 24 hours, the sample analyzed 1.42 weight percent sodium.

Example 5

In the preparation of this example, 30.7 grams of a crystalline aluminosilicate (81.2% solids) identified as zeolite ZSM-3 (0.3–0.8 $Li_2O$ : 0.7–0.2 $Na_2O$ : $Al_2O_3$ : 2.8–4 $SiO_2$ : 0–9 $H_2O$) were blended with 257 grams McNamee kaolin clay (87.4% solids) and 600 cc. water in a blender for 2 minutes. The resulting slurry, after being dried to remove the liquid phase, was thermally treated at 1225° F.

with 100% steam for 20 hours at atmospheric pressure. The composite analyzed approximately 1.0 weight percent sodium. After treating a test sample of the composite with an excess of 25% aqueous ammonium chloride solution at 180° F. for 24 hours, the sample analyzed 0.8 weight percent sodium.

Catalytic evaluation shown in Table 2, illustrates that the catalyst compositions prepared in accordance with the invention, are very active and selective.

TABLE 2

| Example | 3 | 4 | 5 |
|---|---|---|---|
| Composition: | | | |
| Na, wt. percent | 1.7 | 1.44 | 1.0 |
| Na, wt. percent after exchange | 1.22 | 1.42 | 0.8 |
| Na, wt. percent exchangeable | .48 | .02 | 0.2 |
| Catalytic Evaluation: | | | |
| Conditions: | | | |
| LHSV | 2 | 4 | 4 |
| C/O | 3 | 1.5 | 1.5 |
| Conversion, vol. percent | 35.1 | 44.0 | 55.2 |
| C₅+Gasoline, vol. percent | 29.5 | 39.1 | 48.4 |
| Total C₄'s, vol. percent | 6.2 | 8.2 | 11.2 |
| Dry Gas, wt. percent | 3.7 | 3.8 | 4.3 |
| Coke, wt. percent | 1.6 | 1.0 | 1.1 |
| H₂, wt. percent | 0.18 | 0.02 | 0.06 |
| Delta Advantage Over Si/Al: C₅+Gasoline, vol. percent | +1.7 | +5.9 | +8.5 |

Examples 6, 7 and 8 illustrate the use of steam-unstable alkali metal aluminosilicates in which the original sodium cations have been partially exchanged with other metal cations.

Example 6

In this example, 59.8 grams of a partially exchanged rare earth zeolite X aluminosilicate (6.3 weight percent Na) were mixed with 229 grams McNamee kaolin clay and 600 cc. water for 2 minutes in a blender. The resulting slurry, after being dried to remove the liquid phase was thermally treated at 1225° F. with 100% steam for 20 hours at atmospheric pressure followed by a second thermal treatment at 1200° F. with 100% steam for 24 hours under a pressure of 15 p.s.i.g. The product analyzed 0.84 weight percent sodium. Upon treating a test sample of the composite with an excess of 25% aqueous ammonium chloride solution at 180° F. for 24 hours substantially no sodium was removed from the sample.

Example 7

In this example, a partially exchanged calcium zeolite X aluminosilicate (6.3 weight percent Na) was mixed with McNamee kaolin clay in the same manner as Example 6. The sample analyzed 1.3 weight percent sodium and upon treating a test sample of the composite with excess ammonium chloride solution substantially no sodium was removed from the sample.

Example 8

In this example, a partially exchanged manganese zeolite X aluminosilicate (6.3 weight percent Na) was mixed with McNamee kaolin clay in the same manner as Example 6. The sample analyzed 1.3 weight percent sodium and upon treating a test sample of the composite with excess ammonium chloride solution substantially no sodium was removed from the sample.

The catalytic evaluation of the data shown below in Table 3, show the exceptional catalytic results.

TABLE 3

| Example | 6 | 7 | 8 |
|---|---|---|---|
| Composition: | | | |
| Na, wt. percent | 0.84 | 1.3 | 1.3 |
| Na, wt. percent exchangeable | Nil | Nil | Nil |
| Catalytic Evaluation: | | | |
| Conditions: | | | |
| LHSV | 4 | 4 | 4 |
| C/O | 1.5 | 1.5 | 1.5 |
| Conversion, vol. percent | 60.9 | 51.5 | 52.0 |
| C₅+Gasoline, vol. percent | 52.7 | 45.8 | 47.0 |
| Total C₄'s, vol. percent | 11.9 | 9.6 | 8.9 |
| Dry Gas, wt. percent | 5.1 | 4.2 | 4.0 |
| Coke, wt. percent | 1.6 | 1.2 | 1.1 |
| H₂, wt. percent | 0.04 | 0.04 | 0.04 |
| Delta Advantage Over Si/Al: C₅+Gasoline, vol. percent | +9.8 | +8.1 | +9.6 |

Examples 9 through 15 illustrate various types of metal salt promoters which can be employed in the preparation of the catalyst compositions of the invention.

Example 9

In the preparation of this example, 25.9 grams of a crystalline aluminosilicate indentified as zeolite X (96.8 wt. percent solids) was mixed with 18.65 grams of rare earth chloride hexahydrate, 257 grams of McNamee kaolin clay (87.4% solids) together in 600 cc. water for two minutes in a blender. The resulting slurry, after being dried to remove the liquid phase, was thermally treated at 1200° F. with 100% steam for 24 hours under a pressure of 15 p.s.i.g. The product analyzed 1.3 wt. percent sodium. After treating a test sample of the composite with an excess of 25% aqueous ammonium chloride solution at 180° F. for 24 hours, the sample analyzed 1.23 wt. percent sodium.

Example 10

In the preparation of this example, 30.1 grams of sodium faujasite (Si/Al>1.5; 83% solids) was mixed with 11.1 grams of rare earth chloride hexahydrate, 258 grams of McNamee kaolin clay together in 600 cc. water for two minutes in a blender. The resulting slurry, after being dried to remove the liquid phase, was thermally treated at 1200° F. with 100% steam for 24 hours under a pressure of 15 p.s.i.g. The product analyzed 0.75 wt. percent sodium. Upon treating a test sample of the composite with an excess of 25% aqueous ammonium chloride solution at 180° F. for 24 hours, substantially no sodium was removed.

Example 11

This example was prepared in a manner identical to Example 10, using the same procedure and amounts of sodium faujasite, clay and rare earth salt. Instead of mixing in water, benzene was used. The product analyzed 1.0% sodium. After treating a test sample of the composite with an excess of 25% aqueous ammonium chloride solution at 180° F. for 24 hours, the sample analyzed 0.98 wt. percent sodium.

Example 12

In the preparation of this example, 29.5 grams of a crystalline aluminosilicate identified as sodium faujuasite (Si/Al>1.5; 85% solids) was mixed with 11.5 grams $Cr(NO_3)_3 \cdot 9H_2O$, 257 grams McNamee kaolin clay in 800 cc. of benzene for two minutes in a blender. The resulting slurry, after being dried to remove the liquid phase, was thermally treated at 1225° F. with 100% steam for 20 hours under atmospheric pressure. The product analyzed 1.04 wt. percent sodium. After treating a test sample of the composite with an excess of 25% aqueous ammonium chloride solution at 180° F. for 24 hours, the sample analyzed 0.77 wt. percent sodium.

Example 13

This example was prepared in a manner identical to Example 12 except that the metal salt employed was 6.95 grams of $ZrOCl_2 \cdot 8H_2O$. The product analyzed 0.94 wt. percent sodium. After treating a test sample of the composite with an excess of 25% aqueous ammonium chloride solution at 180° F. for 24 hours, the sample analyzed 0.79 wt. percent sodium.

Example 14

This example was prepared in a manner identical to Example 12 except that the metal salt employed was 8.75 grams of $MgCl_2 \cdot 6H_2O$. The product analyzed 1.02 wt. percent sodium. After treating a test sample of the composite with an excess of 25% aqueous ammonium chloride solution at 180° F. for 24 hours, the sample analyzed 0.97 wt. percent sodium.

Example 15

This example was prepared in a manner identical to Example 12 except that the metal salt employed was 8.53 grams of $MnCl_2 \cdot 6H_2O$. The product analyzed 0.95 wt. percent sodium. After treating a test sample of the composite with an excess of 25% aqueous ammonium chloride solution at 180° F. for 24 hours, the sample analyzed 0.89 wt. percent sodium.

The catalytic evaluation of the data shown in Table 4 again illustrates the exceptional activity and selectivity of the catalyst compositions prepared in accordance with the invention.

TABLE

| Example | 9 | 10 | 11 | 12 | 13 | 14 | 15 |
|---|---|---|---|---|---|---|---|
| Composition: | | | | | | | |
| Na, wt. percent | 1.3 | 0.75 | 1.0 | 1.04 | 0.94 | 1.02 | 0.95 |
| Na, wt. percent after exchange | 1.23 | ---- | 0.98 | 0.77 | 0.79 | 0.97 | 0.89 |
| Na, wt. percent exchangeable | .07 | Nil | .02 | .27 | .15 | .05 | .06 |
| Catalytic Evaluation: | | | | | | | |
| Conditions: | | | | | | | |
| LHSV | 4 | 4 | 4 | 4 | 4 | 4 | 4 |
| C/O | 1.5 | 1.5 | 1.5 | 1.5 | 1.5 | 1.5 | 1.5 |
| Conversion, vol. percent | 65.0 | 72.5 | 62.1 | 67.8 | 71.8 | 74.3 | 72.4 |
| $C_5+$ Gasoline, vol. percent | 55.2 | 62.4 | 54.7 | 57.8 | 58.4 | 62.7 | 61.0 |
| Total $C_4$'s, vol. percent | 12.4 | 14.6 | 12.2 | 14.1 | 16.3 | 15.1 | 15.3 |
| Dry Gas, wt. percent | 5.8 | 5.8 | 5.2 | 6.1 | 7.6 | 6.8 | 6.7 |
| Coke, wt. percent | 2.4 | 2.0 | 0.9 | 1.5 | 1.9 | 2.1 | 1.8 |
| $H_2$, wt. percent | 0.08 | 0.05 | 0.04 | 0.05 | 0.01 | 0.05 | 0.07 |
| Delta Advantage Over Si/Al: $C_5+$ Gasoline, vol. percent | +10.2 | +14.0 | +11.2 | +11.4 | +10.3 | +13.6 | +12.7 |

The following Examples 16 to 18 illustrate that the catalyst compositions of the invention can be prepared in preformed shapes for use in commercial units.

Example 16

In this example, 289 grams of sodium faujasite (Si/Al>1.5; 51.8 solids), 862 grams of McNamee kaolin clay (87% solids) and 105.6 grams bentonite clay (94.6% solids) were mixed together in a blender adding 4000 cc. water. Nine pounds of this slurry was filtered and then extruded hydraulically under 5 to 7 tons pressure through a die having 3/16" holes. A portion of the wet extrudate was cut to about one-quarter inch in length and thermally treated at 1300° F. with 100% steam for 24 hours at atmospheric pressure. The original sodium content of the composite was 1.7 wt. percent. After the thermal treatment, a test sample was treated with an excess of 25% aqueous ammonium chloride solution at 180° F. for 24 hours and the sample analyzed 1.36 wt. percent sodium.

Example 17

This example was prepared in a similar manner to the above example. Half of the initial slurry prepared in Example 16 was spray dried to provide a composition suitable for use in "fluid" conversion processes. The spray-dried material which analyzed 1.7% sodium, was pelleted to a 4 x 10 mesh and thermally treated at 1300° F. with 100% steam for 24 hours at atmospheric pressure. After treating a test sample of the composite with an excess of 25% aqueous ammonium chloride solution at 180° F. for 24 hours, the sample analyzed 1.51 wt. percent sodium.

Example 18

This catalyst was made in bead form by mixing the following solutions.

Silicate solution (A): Lbs.
Q brand silicate ($SiO_2$—28.9 wt. percent; $Na_2O$—8.9 wt. percent; $H_2O$—62.2 wt. percent) ____ 8.72
Water ____ 4.36
McNamee kaolin clay ____ 11.22

Silicate solution (B):
Sodium faujasite (Si/Al>1.5; 51.8 wt. percent solids) ____ 2.66
Water ____ 1.62

These two solutions were mixed together along with Maresperse Compound to aid in dispersing the slurry. The final silicate solution had a specific gravity of 1.324 at 78° F.

Acid solution: Lbs.
Water ____ 20.6
$Al_2(SO_4)_3 \cdot 18H_2O$ ____ 3.03
$H_2SO_4$ 97.6 wt. percent ____ 1.38
Sp. Gr. 1.102 at 86° F.

The silicate and acid solutions were mixed together continuously adding 302 cc. per min. silicate solution at 140° F. with 190 cc. per min. acid solution at room temperature. The resulting sol having a 10.1 pH and a gel time less than one second was formed into particles by spraying the sol into air. The formed particles were subsequently processed by water washing free of soluble ions and then dried at 450° F.

The resulting composition, which analyzed 1.3 wt. percent sodium, was thermally treated at 1200° F. with 100% steam for 24 hours under a pressure of 15 p.s.i.g. After treating a test sample of the composite with an excess of 25% aqueous ammonium chloride solution at 180° F. for 24 hours, the sample analyzed 1.29 wt. percent sodium.

Table 5 below shows that the compositions prepared in Examples 16–18 are excellent catalysts for cracking gas oil.

TABLE 5

| Example | 16 | 17 | 18 |
|---|---|---|---|
| Composition: | | | |
| Na, wt. percent | 1.70 | 1.70 | 1.3 |
| Na, wt. percent after exchange | 1.36 | 1.51 | 1.29 |
| Na, wt. percent exchangeable | .34 | .19 | .01 |
| Catalytic Evaluation: | | | |
| Conditions: | | | |
| LHSV | 4 | 4 | 4 |
| C/O | 1.5 | 1.5 | 1.5 |
| Conversion, vol. percent | 66.7 | 71.3 | 45.9 |
| $C_5+$ Gasoline, vol. percent | 56.5 | 61.7 | 41.8 |
| Total $C_4$'s, vol. percent | 13.4 | 14.0 | 7.8 |
| Dry Gas, wt. percent | 5.8 | 6.0 | 3.7 |
| Coke, wt. percent | 1.8 | 1.6 | 0.8 |
| $H_2$, wt. percent | 0.05 | 0.06 | 0.06 |
| Delta Advantage Over Si/Al: $C_5+$ Gasoline, vol. percent | +10.7 | +13.8 | +7.5 |

Examples 19–21 illustrate the use of varying amounts of the inorganic oxide matrix components and the effect thereof on catalytic behavior.

Example 19

In the preparation of this example, 93 grams of sodium faujasite (Si/Al>1.5; 80.6% solids) was mixed with 201 grams McNamee kaolin clay (87% solids) and 600 cc. water for 2 minutes in a blender. The resulting slurry, after being dried to remove the liquid phase, was thermally treated at 1200° F. with 100% steam for 24 hours under a pressure of 15 p.s.i.g. The product analyzed 2.6 wt. percent sodium.

Example 20

In the preparation of this example, 77.5 grams of sodium faujasite (Si/Al>1.5; 80.6% solids) was mixed with 71.9 grams McNamee kaolin clay (87% solids) and 300 cc. water for 2 minutes in a blender. The resulting slurry, after being dried to remove the liquid phase, was thermally treated at 1200° F. with 100% steam for 24 hours under a pressure of 15 p.s.i.g. The product analyzed 4.4 wt. percent sodium.

Example 21

In the preparation of this example, 191.5 grams of sodium faujasite (Si/Al>1.5; 78.4% solids) was mixed with 114.5 grams McNamee kaolin clay (87.4% solids) and 600 cc. water for 2 minutes in a blender. The resulting slurry, after being dried to remove the liquid phase, was thermally treated at 1200° F. with 100% steam for 24 hours under a pressure of 15 p.s.i.g. The product analyzed 4.8 wt. percent sodium.

Table 6 below illustrates that when the as-synthesized or alkali metal form of the aluminosilicate is employed, the matrix component must be used in an amount corresponding to at least 50 percent by weight based on the final composite.

TABLE 6

| Example | 19 | 20 | 21 |
|---|---|---|---|
| Composition: | | | |
| Matrix conc., wt. percent | 70 | 50 | 40 |
| Na, wt. percent | 2.6 | 4.4 | 4.8 |
| Catalytic Evaluation: | | | |
| Conditions: | | | |
| LHSV | 4 | 4 | 4 |
| C/O | 1.5 | 1.5 | 1.5 |
| Conversion, vol. percent | 73.4 | 45.4 | 20.1 |
| $C_5$+Gasoline, vol. percent | 63.9 | 41.5 | 19.2 |
| Total $C_4$'s, vol. percent | 14.0 | 6.4 | 1.9 |
| Dry Gas, wt. percent | 6.0 | 3.8 | 1.6 |
| Coke, wt. percent | 1.8 | 0.8 | 1.0 |
| $H_2$, wt. percent | 0.03 | 0.04 | 0.01 |
| Delta Advantage Over Si/Al: $C_5$ Gasoline, vol. percent | +9.4 | +3.4 | |

Example 22

In this preparation, 47.9 grams of a crystalline aluminosilicate identified as sodium faujasite (Si/Al>1.5; 50.8 wt. percent solids) was mixed with 600 cc. water and 233 grams of conventional silica-alumina cracking catalyst (10% alumina) which had been pulverized to less than 20 microns. The mixture was blended for 2 minutes. The resulting slurry, after being dried to remove the liquid phase, was thermally treated at 1200° F. with 100% steam for 24 hours under a pressure of 15 p.s.i.g. The product analyzed 1.0 wt. percent sodium. After treating a test sample of the composite with an excess of 25% aqueous ammonium chloride solution at 180° F. for 24 hours, the sample analyzed 0.66 wt. percent sodium. Catalytic evaluation of the catalyst composite for cracking gas oil is shown below in Table 7.

TABLE 7

| Composition: | |
|---|---|
| Na, wt. percent | 1.0 |
| Na, wt. percent after exchange | 0.66 |
| Na, wt. percent exchangeable | 0.34 |
| Catalytic evaluation: | |
| Conditions— | |
| LHSV | 4 |
| C/O | 1.5 |
| Conversion, vol. percent | 39.6 |
| $C_5$+gasoline, vol. percent | 35.1 |
| Total $C_4$'s, vol. percent | 6.7 |
| Dry gas, wt. percent | 3.1 |
| Coke, wt. percent | 1.6 |
| $H_2$, wt. percent | 0.02 |
| Delta advantage over Si/Al: | |
| $C_5$+gasoline, vol. percent | +4.5 |

The following example illustrates the preparation of a catalyst which is useful for hydrocracking hydrocarbon fractions such as petroleum gas oils as previously described.

Example 23

In this preparation, a composite containing 30 weight percent sodium faujasite (Si/Al>1.5) and 70 weight percent McNamee clay was prepared in a manner similar to that described in Example 19, except that the thermal interaction was carried out at 1225° F. with 100 percent steam for 20 hours at atmospheric pressure. 246.2 grams of this product was impregnated under vacuum with 141.5 cc. of ammonium tungstate solution (0.203 gram tungsten/cc. solution) in a 2-step operation to deposit 10 weight percent tungsten. The resulting product, after being dried at 230° F., was then impregnated with 141 cc. of solution containing 56.75 grams $Ni(NO_3)_2 \cdot 6H_2O$ to deposit 4 weight percent nickel. The final product was then dried for 20 hours at 230° F. and calcined for 10 hours at 1000° F.

Example 24

The particular sample of catalytic composite used in this test was prepared by mixing 521 grams of sodium zeolite Y, dried at 230° F. (51.8 weight percent solids), with 1090 grams of McNamee clay to constitute a catalytic composite containing 20 weight percent active component. 3270 cc. of water was used to aid in the dispersion. The mixing was carried out in a blender by mixing vigorously for 2 minutes. Following the mixing, the wet slurry was dried at 230° F., then pelleted and sized 4–10 mesh, calcined for 10 hours at 1000° F., and then charged to an automatic cycling unit. In this cyclic unit, the catalyst was subjected to alternate cracking and regeneration periods. The cyclic treatment was as follows:

| Sequence | Charging | Pressure, p.s.i.g. | Temp., °F. | Stage | Time (min.) |
|---|---|---|---|---|---|
| 1 | Air | 0 | 950 | Regeneration | 20 |
| 2 | Air | 0 | 1,150–1,200 | do | 30 |
| 3 | Air | 0 | 1,200–950 | Cooling | 15 |
| 4 | $N_2$ | 0–15 | 950 | Pressuring to run conditions | 2 |
| 5 | Steam | 15 | 950 | Steam treat | 10 |
| 6 | Steam and oil* | 15 | 950 | Cracking | 10 |
| 7 | $N_2$ | 15–0 | 950 | Purge and depressure | 10 |

*Steam was 5 weight percent of the oil.

The catalyst was initially evaluated at CAT–C conditions of 4 LHSV, 1.5 C/O and at 900° F. charging wide range Mid-Continent gas oil, and after 70, 145, 217, 290 and 344 cycles as described above. Catalytic results are summarized as follows:

| No. Cycles | Vol. Percent Conversion | Vol. Percent $C_5$+Gasoline | $C_5$ Gasoline Advantages Over Si/Al at Same Conversion |
|---|---|---|---|
| 0 | 48.6 | 27.1 | −8.9 |
| 0 | 51.6 | 30.5 | −7.3 |
| 70 | 69.6 | 50.4 | +3.2 |
| 70 | 70.1 | 51.1 | +3.7 |
| 145 | 74.3 | 56.9 | +7.8 |
| 145 | 72.0 | 54.9 | +6.7 |
| 217 | 72.8 | 56.2 | +7.7 |
| 217 | 73.1 | 57.4 | +8.8 |
| 290 | 73.8 | 58.5 | +9.6 |
| 290 | 74.1 | 58.0 | +9.6 |
| 344 | 75.2 | 60.0 | +10.6 |
| 344 | 74.1 | 59.0 | +10.6 |

These data show that, in about 70 cycles of operation, the catalytic composite can be converted to yield catalytically selective composite. Continued cyclic treatment shows continued improvement in catalytic selectivity.

These data show that these catalytic solid-solid interactions can be accomplished at conditions present in commercial units.

As shown above, catalysts of good initial activity can be prepared by steaming blends of matrix material with zeolites of high or low silica content. However, it has been found that such blends of low silica zeolite are unstable unless polyvalent metal compound (oxide or salt) be added to the reaction mixture. Thus, the general method (without added metal compound) produces good, stable catalyst only with aluminosilicates of silicon to aluminum ratio at least as great as 1.5.

The data in Examples 25, 26 and 27, taken with Table 8, show that, using kaolinite clay, the NaX product gave catalytic results even poorer than 100 percent kaolinite (steam-treated in the same way) by itself. The sodium zeolite Y, on the other hand, gave a very active and selective catalyst.

Example 25

A batch of kaolinite clay (McNamee) was pelleted, crushed and screened to give a 500 cc. sample of 4–10 mesh particles. This material was calcined in air for 10 hours at 1000° F. Half the batch was then treated in 100 percent steam for 24 hours at 1200° F. and 15 p.s.i.g. prior to testing for gas oil cracking.

Example 26

A 26.1-gram portion of synthetic NaX zeolite (Linde 13X) (95.6 percent solids) and a 258-gram portion of kaolinite clay (McNamee) (87.4 percent solids) were mixed for 2 minutes with 600 cc. of $H_2O$ in a Waring Blendor. The resulting slurry was dried overnight at 230° F., pelleted, ground and screened to obtain 4–10 mesh particles, which were then calcined in air for 10 hours at 1000° F. The batch was then split in halves. One half was treated in 100 percent steam for 24 hours at 1200° F. and 15 p.s.i.g. prior to testing for gas oil cracking.

Example 27

A 31-gram portion of synthetic NaY zeolite (80.6 percent solids) and a 259-gram portion of kaolinite clay (McNamee) (87 percent solids) were mixed for 2 minutes with 600 cc. of $H_2O$ in a Waring Blendor. The resulting slurry was dried overnight at 230° F., pelleted, crushed and screened to obtain 4–10 mesh particles, which were then calcined in air for 10 hours at 1000° F. The batch was then split in halves. One half was treated in 100 percent steam for 24 hours at 1200° F. and 15 p.s.i.g. prior to testing for gas oil cracking.

TABLE 8

| Example | 25 | 26 | 27 |
|---|---|---|---|
| Sieve, 10% | | NaX | NaY |
| Kaolinite, percent | 100 | 90 | 90 |
| Gas Oil Cracking Data at 4.0 LHSV and 1.5 C/O: | | | |
| Conversion, vol. percent | 22.8 | 16.3 | 59.3 |
| $C_5$+Gasoline, vol. percent | 21.1 | 15.0 | 51.9 |
| Total $C_4$'s, vol percent | 1.7 | 1.6 | 11.7 |
| Dry Gas, wt percent | 2.0 | 1.6 | 4.8 |
| Coke, wt. percent | 0.8 | 1.2 | 1.2 |

(after 72 hours of steaming) gives 20.3 percent conversion. The NaY catalyst, on the other hand, started with an extraordinarily high activity and selectivity, most of which was retained after the steaming process.

Example 28

A 25.9-gram portion of synthetic NaX zeolite (Linde 13X) (96.8 percent solids) and a 277-gram portion of halloysite clay (81.3 percent solids) were mixed for 2 minutes with 600 cc. of $H_2O$ in a Waring Blendor. The resulting slurry was dried overnight at 230° F., pelleted, crushed and screened to obtain a batch of 4–10 mesh particles. This material was calcined in air for 10 hours at 1000° F. After treating with 100 percent steam for 20 hours at 1225° F. and atmospheric pressure, it was tested for gas oil cracking. The results of this test are given in column 1, Table 9. It was then further treated with 100 percent steam for 24 hours at 1200° F. and 15 p.s.i.g. and retested for gas oil cracking. The results of this test are given in column 2, Table 9. And, finally, the catalyst was further treated with 100 percent steam for an additional 48 hours (72 hours total) at 1200° F. and 15 p.s.i.g. and again tested for gas oil cracking. The results of this test are given in column 3, Table 9.

Example 29

A batch of halloysite clay pellets was crushed and screened to obtain a 250 cc. sample of 4–10 mesh particles. This material was calcined in air for 10 hours at 1000° F. It was then treated with 100 percent steam for 72 hours at 1200° F. and 15 p.s.i.g. prior to testing for gas oil cracking.

Example 30

54.4-gram portion of synthetic NaY zeolite (46 percent solids) and a 277-gram portion of halloysite (81.3 percent solids) were mixed for 2 minutes with 600 cc. of $H_2O$ in a Waring Blendor. The resulting slurry was dried overnight at 230° F., pelleted, crushed and screened to give a batch of 4–10 mesh particles. This material was calcined in air for 10 hours at 1000° F. After treating with 100 percent steam for 20 hours at 1225° F. and atmospheric pressure, it was tested for gas oil cracking. The results of this test are given in column 5, Table 9. It was then further treated with 100 percent steam for 24 hours at 1200° F. and 15 p.s.i.g. and retested for gas oil cracking. The results of this test are given in column 6, Table 9. And, finally, the catalyst was further treated with steam for an additional 48 hours (72 hours total) at 1200° F. and 15 p.s.i.g. and again tested for gas oil cracking. The results of this test are given in column 7, Table 9.

TABLE 9

| | Column No. | | | | | | |
|---|---|---|---|---|---|---|---|
| | 1 | 2 | 3 | 4 | 5 | 6 | 7 |
| Example | | 28 | | 29 | | 30 | |
| Sieve, 10% | | NaX | | | | NaY | |
| Halloysite, percent | | 90 | | 100 | | 90 | |
| Hours at 15 p.s.i.g., Steam | 0 | 24 | 72 | 72 | 0 | 24 | 72 |
| Gas Oil Cracking Data (CAT-C) at 4 LHSV and 1.5 C/O: | | | | | | | |
| Conversion, vol. percent | 44.0 | 33.5 | 29.5 | 20.3 | 75.2 | 70.6 | 60.3 |
| $C_5$+Gasoline, vol. percent | 39.1 | 32.6 | 27.1 | 18.1 | 61.3 | 58.6 | 51.5 |
| Total $C_4$'s, vol. percent | 8.2 | 5.2 | 4.9 | 3.4 | 17.7 | 15.6 | 13.2 |
| Dry Gas, wt. percent | 3.8 | 2.9 | 2.5 | 2.2 | 7.3 | 6.3 | 5.1 |
| Coke, wt. percent | 1.0 | 0.9 | 0.7 | 0.6 | 2.2 | 1.8 | 1.1 |

The data in Examples 28, 29 and 30, taken with Table 9, show that it is possible to prepare a catalyst from NaX and halloysite having a moderate activity (though less than the activity of conventional silica-alumina) and good selectivity. However, the stability of the catalyst is very poor. After 72 hours of pressure steaming, it gives a conversion of only 29.5 percent, and halloysite clay by itself

We claim:
1. A process for preparing a catalyst composite which comprises forming a reaction mixture comprising:
    (a) a matrix composed of at least two inorganic oxides, wherein at least one inorganic oxide is selected from the group consisting of siliceous oxides and alumina-containing oxides, with the proviso that the siliceous oxide be present in amounts no greater than 90 weight percent, based on the weight of the matrix, and any alumina-containing oxide be present in amounts of at least 10 weight percent, based on the weight of the matrix; and (b) a steam-unstable, base exchangeable crystalline metal aluminosilicate having a silicon to aluminum ratio of at least about 1.5 and characterized by pore openings greater than 6 and less than 15 Angstrom units in diameter, and containing greater than 4 weight percent alkali metal, said aluminosilicate being present in an amount less than 60 percent by weight, based on the final composite; and thereafter heating said reaction mixture in the presence of steam at temperatures of at least 800° F. for at least one-half hour in order to reduce the exchangeable alkali metal content of the reaction mixture and to provide a steam stable catalyst composition having an exchangeable alkali metal content of not more than 0.6 weight percent as determined by base exchange with an excess of 25 percent aqueous ammonium chloride solution at 180° F. for 24 hours.

2. The process of claim 1 wherein at least one of the inorganic oxides of the matrix is alumina present in an amount ranging from 15 to 55 weight percent based on total matrix.

3. The process of claim 2 wherein the matrix is a member selected from the group consisting of natural clay, chemically treated clay and calcined clay.

4. The process of claim 2 wherein the matrix is a synthetic composite of silica and alumina having an alumina content of at least 25 weight percent.

5. The process of claim 2 wherein the aluminosilicate is an alkali metal aluminosilicate which is present in an amount less than 25 weight percent based on the final composite.

6. The process of claim 2 wherein the aluminosilicate has the crystallographic structure of faujasite.

7. The process of claim 3 wherein the aluminosilicate has the crystallographic structure of faujasite.

8. The process of claim 3 wherein the matrix is a clay of the kaolinite group.

9. The process of claim 8 wherein the aluminosilicate has the crystallographic structure of faujasite.

10. The process of claim 8 wherein the catalyst composition has an exchangeable alkali metal content of not more than 0.4 weight percent.

References Cited
UNITED STATES PATENTS 3,130,007    4/1964    Breck _____ 23—113
3,257,310    6/1966    Plank et al. _____ 208—120

ABRAHAM RIMENS, *Primary Examiner.*